United States Patent

(12) United States Patent
Perez

(10) Patent No.: US 9,227,790 B2
(45) Date of Patent: Jan. 5, 2016

(54) BIOMASS FEEDING SYSTEM

(71) Applicant: GRUPO GUASCOR S.L., Olean, NY (US)

(72) Inventor: Ernesto Esperanza Perez, Minano (ES)

(73) Assignee: Dresser-Rand Company, Olean, NY (US)

( * ) Notice: Subject to any disclaimer, the term of this patent is extended or adjusted under 35 U.S.C. 154(b) by 43 days.

(21) Appl. No.: 13/898,838

(22) Filed: May 21, 2013

(65) Prior Publication Data

US 2013/0313481 A1 Nov. 28, 2013

(30) Foreign Application Priority Data

May 24, 2012 (EP) .................................... 12382203

(51) Int. Cl.
*B65G 33/14* (2006.01)
*C10J 3/50* (2006.01)

(52) U.S. Cl.
CPC ................ *B65G 33/14* (2013.01); *C10J 3/503* (2013.01); *C10J 2200/158* (2013.01)

(58) Field of Classification Search
CPC ........................... B65G 33/08; B65G 49/0422
USPC .................... 198/601, 602; 252/373
See application file for complete search history.

(56) References Cited

U.S. PATENT DOCUMENTS

2010/0040510 A1* 2/2010 Randhava et al. ............ 422/140
2011/0192329 A1* 8/2011 Hamel et al. .................. 110/222

OTHER PUBLICATIONS

Dai et al. "Biomass feeding for thermochemical reactors", Progress in Energy and Combustion Science 38 (2012) 716-736.*

* cited by examiner

*Primary Examiner* — Stanley Silverman
*Assistant Examiner* — Syed Iqbal
(74) *Attorney, Agent, or Firm* — Edmonds & Nolte, PC

(57) ABSTRACT

A method and a system are provided for feeding a biomass material feed into a fluidized bed gasifier. The system includes a first plurality of screw conveyors disposed circumferentially around and connected to or integral with a gasifier shell of the fluidized bed gasifier, such that each of the first plurality of screw conveyors is in feed communication with a gasifier chamber defined by the gasifier shell. The system also includes a plurality of secondary receptacles, each individually coupled to a respective screw conveyor of the first plurality of screw conveyors, such that each of the plurality of secondary receptacles includes a secondary receptacle shell defining a secondary receptacle chamber in feed communication with the respective screw conveyor. The system further includes a plurality of primary receptacles, each including a primary receptacle shell defining a primary receptacle chamber in feed communication with at least two of the plurality of secondary receptacles.

16 Claims, 4 Drawing Sheets

BIOMASS FEEDING SYSTEM

BACKGROUND

This application claims priority to European Patent Application Serial No. 123882203.3, which was filed May 24, 2012. This priority application is hereby incorporated by reference in its entirety into the present application, to the extent that it is not inconsistent with the present application.

Hydrocarbons are a major source of energy for much of the world's energy needs. Recent cost increases in hydrocarbon-based fuels, induced in part by increased demand for hydrocarbons from developing countries and concerns of supply shortages due to the increased demand, has generated increased interest in finding alternative sources of energy for the world's needs. In researching alternative energy sources, focus has been directed to those energy sources meeting at least the criteria of being inexpensive, renewable, and plentiful.

One such alternative energy source capable of meeting the aforementioned criteria has been developed from biological waste products. Biological waste products are a desirable energy source due to the prevalence of such products, and the accompanying need to dispose of these products in an environmentally prudent manner. Such biological waste products are generally referred to as biomass and may include agricultural and other cellulosic waste materials. Nonlimiting examples of biomass may include forest residues, agricultural residues, nuts, nut shells, wood chips, olive and grape mash, and urban biomass, such as municipal solid waste.

Biomass may be converted into a useful gas mixture through a process of gasification. Generally, gasification is a process that converts at least a portion of the biomass material into a useful gas mixture, commonly referred to as synthesis gas (or syngas), through the reaction of the biomass material at high temperatures (>700° C.) with a controlled amount of oxygen and/or steam. Synthesis gas is combustible and may be utilized, for example, as a fuel gas in gas and steam boiler plants, as an intermediate in generating synthesis natural gas, or for the production of other chemicals, such as methanol.

The gasification process may be carried out at least in part in a gasification unit, commonly referred to as a gasifier. The gasifier may be, for example, a counter-current fixed bed gasifier, a co-current fixed bed gasifier, a fluidized bed gasifier, an entrained flow gasifier, or a plasma gasifier. The type of gasifier utilized may be based in part on particular technological and/or commercial needs or factors. For instance, the fluidized bed gasifier may be very useful for feed fuels forming highly corrosive ash due to the propensity of such ash to damage the walls of other gasifiers. Because biomass material is a feed fuel that generally contains high levels of corrosive ash, a fluidized bed gasifier may be often utilized for converting biomass feed material to synthesis gas through the process of gasification.

Typically, the biomass material is fed to the fluidized bed gasifier through a single inlet defined by the fluidized bed gasifier. In feeding the biomass material into the fluidized bed gasifier through the single inlet, the reaction in the gasifier may occur in only a portion of the gasifier causing undesirable pressure and temperature differentials in the gasifier. Such a pressure and temperature differential may result in a portion of the biomass material exiting the gasifier unreacted, thus resulting in lower process efficiency.

What is needed, then, is a system for feeding biomass material into a fluidized bed gasifier such that the homogeneity of pressure and temperature in the reactor is increased, thereby resulting in an improvement in the conversion of biomass material to synthesis gas and increased process efficiency.

SUMMARY

Embodiments of the disclosure may provide a system for feeding a biomass material feed into a fluidized bed gasifier. The system includes a first plurality of screw conveyors disposed circumferentially around and connected to or integral with a gasifier shell of the fluidized bed gasifier, such that each of the first plurality of screw conveyors is in feed communication with a gasifier chamber defined by the gasifier shell. The system also includes a plurality of secondary receptacles, each individually coupled to a respective screw conveyor of the first plurality of screw conveyors, such that each of the plurality of secondary receptacles includes a secondary receptacle shell defining a secondary receptacle chamber in feed communication with the respective screw conveyor. The system further includes a plurality of primary receptacles, each including a primary receptacle shell defining a primary receptacle chamber in feed communication with at least two of the plurality of secondary receptacles.

Embodiments of the disclosure may further provide a system for producing a synthesis gas from a biomass material feed in a fluidized bed gasifier. The system includes a first plurality of screw conveyors, each disposed equidistantly from an adjacent one of the first plurality of screw conveyors and circumferentially around and connected to or integral with a gasifier shell of the fluidized bed gasifier, such that each of the first plurality of screw conveyors is in feed communication with a gasifier chamber defined by the gasifier shell. The system also includes a plurality of secondary hoppers each coupled to respective one of the first plurality of screw conveyors and further configured to provide a continuous feed of the biomass material feed to the respective one of the first plurality of screw conveyors. The system further includes at least one primary hopper configured to provide each of the plurality of secondary hoppers with the continuous feed of the biomass material feed.

Embodiments of the disclosure may further provide a method for producing a synthesis gas from a biomass material feed in a fluidized bed gasifier. The method includes feeding the biomass material feed into a biomass feed system including a plurality of screw conveyors, each disposed equidistantly from an adjacent one of the plurality of screw conveyors and circumferentially around and connected to or integral with a gasifier shell of the fluidized bed gasifier, such that a substantially equal amount of the biomass feed material flows through each of the plurality of screw conveyors into the gasifier chamber. The method also includes feeding a fluid flow into a bottom section of the gasifier chamber of the fluidized bed gasifier, such that the fluid flow and the biomass material feed contact and react to form the synthesis gas.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
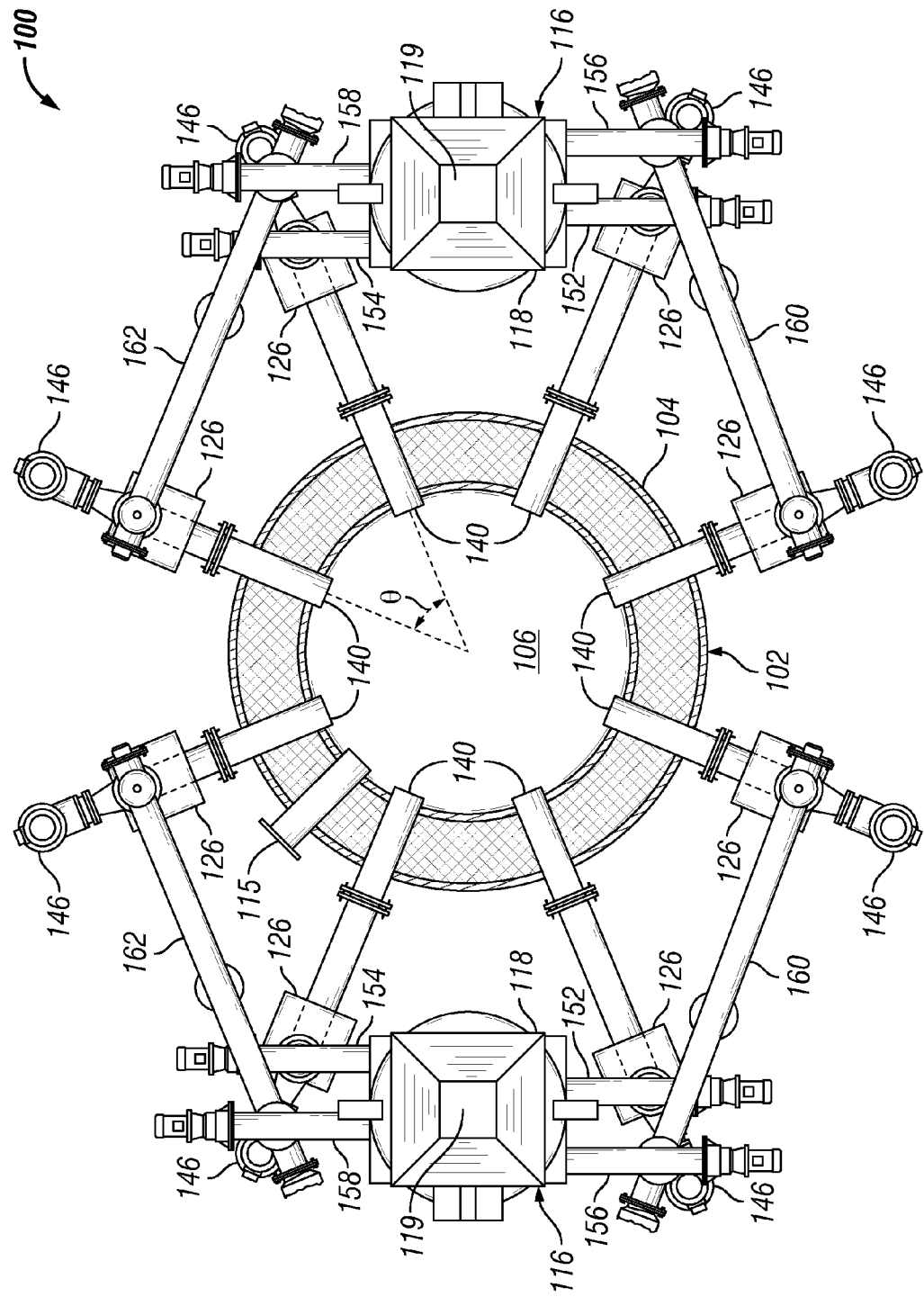
FIG. 1 illustrates a top plan view of a biomass feed system, according to an embodiment.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
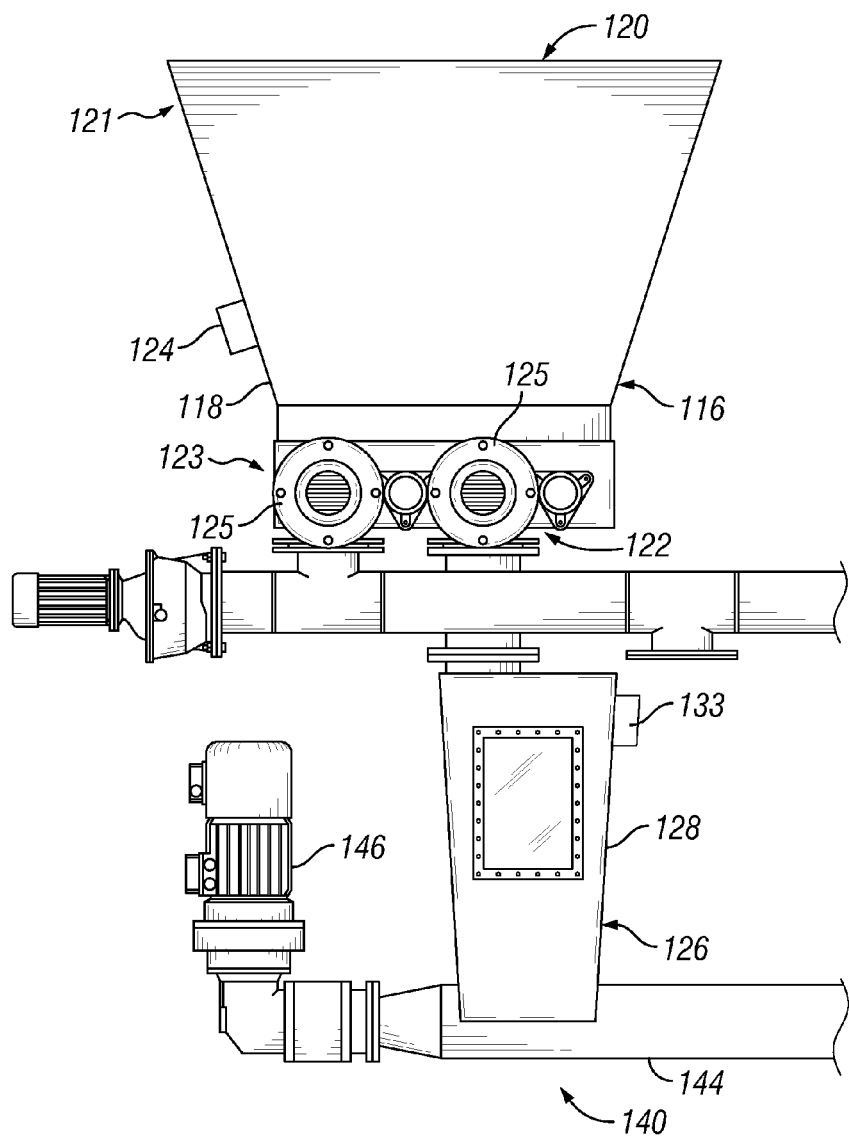
FIG. 2 illustrates a side elevation view of a section of the biomass feed system including a primary receptacle and a secondary receptacle, according to an embodiment.
Figure 3:
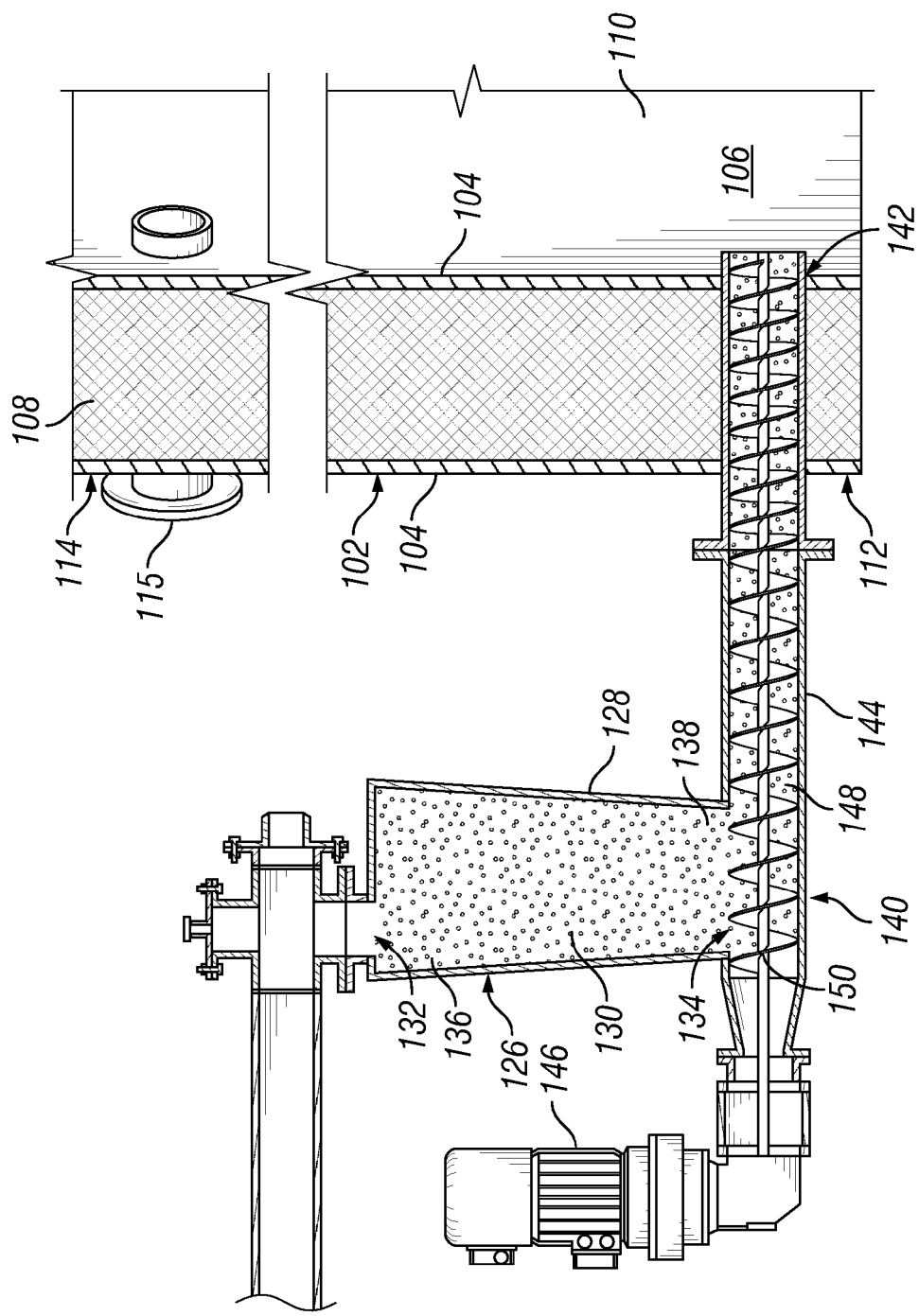
FIG. 3 illustrates a cross-sectional view of a section of the biomass feed system including a secondary receptacle and a screw conveyor, according to an embodiment.

FIGS. 1-3 illustrate an exemplary biomass feed system 100, according to an embodiment. In an exemplary embodiment, the biomass feed system 100 is configured to feed biomass material to a fluidized bed gasifier 102. The biomass material may be a homogeneous biomass material, such that the biomass material is formed from a single source. The biomass material may instead be a heterogeneous biomass material, such that the biomass material is formed from a plurality of sources. The biomass material may include, for example, forest residues, agricultural residues, nuts, nut shells including almond shells, wood chips including pine, eucalyptus, oak, and poplar, olive and grape mash, and rice husks. The biomass material may include low density biomass material generally having a density less than about 250 kg/m$^3$, and in an exemplary embodiment, having a density less than 150 kg/m$^3$.

The fluidized bed gasifier 102 may include a cylindrical gasifier shell 104 defining a gasifier chamber 106, which, as shown in FIG. 3, has a top gasifier chamber section 108 and a bottom gasifier chamber section 110. A distributer plate (not shown) may be disposed in the bottom gasifier chamber section 110 and above a gasifier fluid inlet (not shown) defined by a bottom section 112 of the cylindrical gasifier shell 104. The gasifier fluid inlet may be configured to feed an oxidant, such as air or oxygen, and/or steam to the gasifier chamber 106. The distributor plate may further define a plurality of plate openings (not shown) configured to provide a fluid passageway through which the gasifier fluid inlet feed may flow. The plate openings may be further configured to induce turbulence in the gasifier fluid inlet feed flow.

A syngas feed outlet 115 is defined by a top section 114 of the cylindrical gasifier shell and is configured to feed syngas produced from the reaction of the biomass material to an external component, e.g., scrubber, for further processing. In another embodiment, the fluidized bed gasifier 102 may include one or more cyclones (not shown) disposed in the top section 108 of the gasifier chamber and in fluid communication with the gasifier chamber 106 and the syngas feed outlet 115. The cyclone(s) may be configured to separate one or more biomass particulates of the biomass material feed from the syngas feed, such that the syngas feed may flow through the syngas feed outlet 115 and the one or more biomass particulates may be routed to the bottom section 110 of the gasifier chamber 106.

The biomass feed system 100 may include one or more primary receptacles, illustrated as a plurality of primary hoppers 116 in FIG. 1. In an exemplary embodiment, the plurality of primary hoppers 116 includes two primary hoppers, such that the primary hoppers may be disposed proximate to and circumferentially around the fluidized bed gasifier 102. In an exemplary embodiment, each primary hopper 116 is disposed proximate to an opposing side of the fluidized bed gasifier 102 and is 180 degrees apart from the other primary hopper. However, embodiments in which the primary hoppers 116 are greater or less than 180 degrees apart are contemplated herein. Further, additional or fewer primary hoppers 116 may be used without departing from the scope of the disclosure.

Each primary hopper 116 may include one or more primary sidewalls 118 defining a primary hopper chamber 119. In an exemplary embodiment, the primary hopper 116 includes four primary sidewalls 118 defining at least in part the primary hopper chamber 119. The primary sidewalls 118 may be configured such that the primary sidewalls 118 further define a primary hopper top section 121 defining a primary hopper top opening 120 and, in addition, define at least in part a primary hopper bottom section 123 defining a primary hopper bottom opening 122. The primary hopper bottom section 123 may include a plurality of primary hopper screw conveyors 125 proximate to and in feed communication with the bottom section opening 123. In an exemplary embodiment, the primary hopper bottom section 123 may include four primary hopper screw conveyors 125 configured in pairs and oriented such that a pair of the primary screw conveyors 125 opposes the other pair of primary screw conveyors 125. The primary hopper top opening 120 may be configured to define a larger surface area opening than the primary hopper bottom opening 122, thereby allowing an increased biomass material feed through the primary hopper top opening 120.

In an exemplary embodiment, the primary hopper 116 may be operatively coupled to a primary hopper level detector 124. The primary hopper level detector 124 may include a sensor, and is configured to detect the level of biomass material disposed within the primary hopper 116 during operation of the biomass feed system 100. The primary hopper level detector 124 may be further configured to transmit a signal to a controller (not shown) when the biomass material disposed within the primary hopper 116 has reached a predefined level, thereby causing additional biomass material to be added to the primary hopper 116. Conversely, the primary hopper level detector 124 may be configured to transmit a signal to the controller when the biomass material disposed within the primary hopper 116 has reached a predefined level, thereby causing the flow of biomass material to the primary hopper 116 to be discontinued.

The biomass feed system 100 further includes one or more secondary receptacles, illustrated as a plurality of secondary hoppers 126 in FIGS. 1-3, in feed communication with a primary hopper 116. In the exemplary embodiment illustrated in FIG. 1, each of the primary hoppers 116 is in feed communication with four secondary hoppers 126. Each secondary hopper 126 is disposed about equidistantly from an adjacent secondary hopper 126 and further disposed proximate to and circumferentially around the fluidized bed gasifier 102 such that the secondary hoppers 126 are oriented at angle θ apart from each other in relation to the center of the fluidized bed gasifier 102. In the illustrated embodiment of FIG. 1, the angle θ is about 45 degrees. Embodiments in which each primary hopper 116 is in feed communication with greater or less than four secondary hoppers 126 are contemplated herein. In such embodiments, each secondary hopper 126 may be disposed equidistantly from an adjacent secondary hopper 126 and further disposed proximate to and circumferentially around the fluidized bed gasifier 102. The angle θ may be greater or less than 45 degrees.

Each secondary hopper 126 may include one or more secondary sidewalls 128 defining a secondary hopper chamber 130. In an exemplary embodiment, the secondary hopper 126 includes four secondary sidewalls 128 defining the secondary hopper chamber 130. The secondary sidewalls 128 may be configured such that the secondary sidewalls further define a secondary hopper top opening 132 and a secondary hopper bottom opening 134. The volume of the secondary hopper chamber 130 in a top section 136 of the secondary hopper chamber 130 may be greater than a bottom section 138 of the secondary hopper chamber 130, thereby allowing the biomass material feed to funnel therethrough.

In an exemplary embodiment, the secondary hopper 126 may be operatively coupled to a secondary hopper level detector 133. The secondary hopper level detector 133 may include a sensor, and is configured to detect the level of biomass material disposed within the secondary hopper 126 during operation of the biomass feed system 100. The secondary hopper level detector 133 may be further configured to transmit a signal to a controller (not shown) when the biomass material disposed within the secondary hopper 126 has reached a predefined level, thereby causing a drive motor 146, discussed further below, to cease operation for a predetermined interval of time. The drive motor 146 may resume operation after the expiration of the predefined time interval.

The biomass feed system 100 may further include a plurality of screw conveyors 140, each configured to receive the biomass material feed from a respective secondary hopper 126. As shown in FIG. 1, the biomass feed system 100 may include a screw conveyor 140 in feed communication with a corresponding secondary hopper 126. The fluidized bed gasifier 102 may be further configured such that the cylindrical gasifier shell 104 may define a plurality of screw conveyor openings 142 configured to sealingly connect the screw conveyor 140 and the cylindrical gasifier shell 104 such that the screw conveyor 140 and gasifier chamber 106 are in feed communication. In another embodiment, each screw conveyor 140 is integral with the cylindrical gasifier shell 104. The screw conveyor openings 142 are defined equidistantly apart from an adjacent screw conveyor opening 142 such that the screw conveyors 140 are spaced equidistantly apart around the circumference of the bottom section 112 of the cylindrical gasifier shell 104. In an exemplary embodiment, each screw conveyor 140 is operatively coupled to the drive motor 146. The drive motor 146 may be, for example, an electric motor.

The screw conveyor 140 may include a screw conveyor housing 144 defining a screw conveyor chamber 148 as shown most clearly in FIG. 3. The screw conveyor 140 further includes an auger 150 operatively connected to the drive motor 148 and configured to urge the biomass material disposed therein toward and into the fluidized bed gasifier 102. The auger may include inox 306 stainless steel material. In an exemplary embodiment, the auger 150 may be a variable-pitch auger. The pitch of the auger 150 may decrease along the flow of the biomass material feed. In another embodiment, the auger 150 may include a single flight variable pitch. In some embodiments, the auger 150 may be a double flight standard pitch. Thrust bearings (not shown) may assist in managing thrust that is exerted onto the auger 150. The auger 150 may be further configured to form a seal with the screw conveyor housing 144 and the biomass material feed when disposed therein and compressed by the auger, such that syngas formed in the fluidized bed gasifier 102 may not flow through the screw conveyor 140 upstream to the external environment.

Turning to the operation of the biomass feed system 100, an exemplary operation of the biomass feed system 100 embodied in FIGS. 1-3 is presented now. In such an exemplary operation, the biomass material feed may be fed to the plurality of primary hoppers 116 illustrated in FIG. 1 from a single biomass material feed source (not shown). In another embodiment, each primary hopper 116 is fed from a separate and distinct biomass material source. In an exemplary embodiment, biomass material feed source provides a continuous biomass material feed to each of the primary hoppers 116. The primary hoppers 116 may be gravity-fed from the biomass material feed source.

In an exemplary operation of the biomass feed system 100, the biomass material feed may include low density wood chips formed from, for example, a poplar tree. However, it will be appreciated by one of ordinary skill in the art that the biomass material feed may be formed from one or more heterogeneous or homogeneous biomass materials sources. Nonlimiting examples of biomass material feed sources include forest residues, agricultural residues, nuts, nut shells including almond shells, wood chips including pine, eucalyptus, oak, and poplar, olive and grape mash, and rice husks.

Biomass material feed enters the primary hopper 116 through the primary hopper top opening 120 and flows through each primary hopper 116 in a condensed and uniform manner such that voids or pockets may be either prevented from forming or substantially eliminated in the biomass material feed disposed in the primary hopper. Gravity forces the biomass material feed toward the primary hopper bottom section 123 and into contact with the plurality of primary hopper screw conveyors 125 disposed in the primary hopper bottom section 123. In an exemplary embodiment, the primary hopper bottom section 123 includes four primary hopper screw conveyors 125. Each of the primary hopper screw conveyors 125 disposed in the primary hopper bottom section 123 is in feed communication with a respective line 152, 154, 156, 158 such that a constant feed of biomass material feed contacting each primary hopper screw conveyor 125 is urged through the primary hopper bottom opening 122 and may flow through the respective one of the lines 152, 154, 156, 158. In an exemplary embodiment, the biomass feed system 100 is configured such that lines 152, 154, 156, 158 are each provided with a substantially equal flow of the biomass material feed therethrough.

The biomass material feed flowing through each of line 152 and line 154 is fed into a respective secondary hopper top opening 132 and into the secondary hopper chamber 130. The biomass material feed flowing through each of line 156 and line 158 is further fed through line 160 and line 162 respectively and through the respective secondary hopper top opening 132 into the secondary hopper chamber 130. In an exemplary embodiment, each of the secondary hoppers 126 may be provided with the biomass material feed having a flow rate substantially similar to the biomass material feed provided to each adjacent secondary hopper 126.

The biomass material feed in each of the secondary hoppers 126 may be fed through the bottom opening 134 of the secondary hopper 126 into the screw conveyor chamber 148 of the screw conveyor 140. A drive motor 146 including a speed regulator (not shown) and operatively connected to the auger 150 may continuously drive the auger 150 thereby causing the auger 150 to rotate at a speed, for example, of 25 Hz in an exemplary embodiment. It will be understood by one of ordinary skill in the art that the rotational speed of the auger 150 may vary based, for example, on the flow rate or the composition of the biomass material feed or the reaction conditions in the fluidized bed gasifier 102. Thus, the rotational speed of the augers 150 may be increased to increase the flow of biomass material feed into the fluidized bed gasifier in order to increase the production of syngas. Conversely, the rotational speed of the augers 150 may be decreased to decrease the flow of biomass material feed into the fluidized bed gasifier in order to decrease the production of syngas. In an exemplary embodiment, the rotational speed of each auger 150 in the biomass feed system 100 may be substantially equal.

As the biomass material feed is fed into the screw conveyor chamber 148, the auger 150 conveys the biomass material feed into the gasifier chamber 106. The biomass material feed is conveyed by the auger 150 such that the auger, screw conveyor housing 144, and biomass material feed form a sealing relationship so that syngas produced in the fluidized bed gasifier 102 may be prevented from flowing back through the screw conveyor housing 144 and upstream of the secondary hopper 126 to the external environment.

In an exemplary embodiment, air is fed from a feed fluid source (not shown) into the gasifier chamber 106 via the gasifier fluid inlet. The air feed contacts the distributor plate disposed in the bottom section 110 of the gasifier chamber, such that the air feed is forced through a plurality of plate openings defined in the distributor plate and configured to induce turbulence in the air feed flow. In addition, a fluidifying agent, e.g., dolomite (having a diameter of 1 mm), may be disposed in the fluidized bed gasifier 102. The biomass material feed may be fed from each screw conveyor 140 into the fluidized bed gasifier 102 at a substantially equal flow rate, and further may contact the turbulent air/dolomite feed thereby reacting to form syngas. The equidistant spacing of the screw conveyors 140 circumferentially around the fluidized bed gasifier 102 and the substantially equal flow rate of the biomass material feed fed through each screw conveyor provides for the biomass material feed to react with the oxygen feed in the fluidized bed gasifier 102 such that the pressure and temperature in a section of the gasifier chamber 106 proximate to a screw conveyor 140 is substantially similar to the temperature and pressure of an adjacent section including an adjacent screw conveyor 140. Such homogeneous pressure and temperature conditions provide for increased efficiency of the conversion of the biomass material feed to syngas.

In an exemplary embodiment, the biomass feed system 100 may be a continuously-run system. The mass flow rate of the biomass material feed entering each primary hopper 116 may determine the flow rate of syngas flowing from the fluidized bed gasifier 102 in at least one embodiment. The mass flow rate of the biomass feed material entering each primary hopper 116 may determine the rotational speed of the auger 150 disposed in the screw conveyor 140 in an exemplary embodiment.

Figure 4:
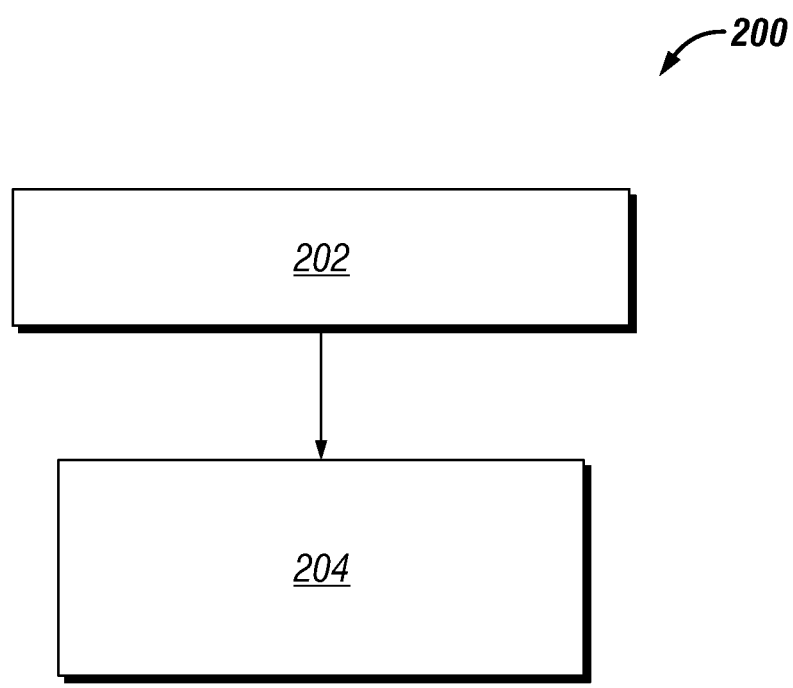
FIG. 4 illustrates a flowchart of a method for producing synthesis gas from a biomass material feed in a fluidized bed gasifier, according to an embodiment.

FIG. 4 illustrates a flowchart of an exemplary method 200 for producing synthesis gas from a biomass material feed in a fluidized bed gasifier, according to an embodiment. The method 200 includes feeding the biomass material feed into a biomass feed system including a plurality of screw conveyors, as at 202. Each of the plurality of screw conveyors may be disposed equidistantly from an adjacent one of the plurality of screw conveyors and circumferentially around and connected to or integral with the gasifier shell of the fluidized bed gasifier. A substantially equal amount of the biomass feed material may flow through each of the plurality of screw conveyors into the gasifier chamber. A fluid flow may be fed into a bottom section of the gasifier chamber of the fluidized bed gasifier, in which the fluid flow and the biomass material feed may contact and react to form synthesis gas, as at 204.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A system for feeding a biomass material feed into a fluidized bed gasifier, comprising:
    a first plurality of screw conveyors disposed circumferentially around and connected to or integral with a gasifier shell of the fluidized bed gasifier, wherein each of the first plurality of screw conveyors is in feed communication with a gasifier chamber defined by the gasifier shell;
    a plurality of secondary receptacles, each individually coupled to a respective screw conveyor of the first plurality of screw conveyors, wherein each of the plurality of secondary receptacles comprises a secondary receptacle shell defining a secondary receptacle chamber in feed communication with the respective screw conveyor; and
    a plurality of primary receptacles, each comprising a primary receptacle shell defining a primary receptacle chamber in feed communication with at least two of the plurality of secondary receptacles, wherein each secondary receptacle of the plurality of secondary receptacles is in feed communication with only one primary receptacle.

2. The system of claim 1, wherein each of the plurality of primary receptacles includes a second plurality of screw conveyors configured to impart motion to the biomass material feed when disposed therein.

3. The system of claim 1, wherein each of the first plurality of screw conveyors is spaced equidistantly from an adjacent one of the first plurality of screw conveyor disposed circumferentially around the gasifier shell of the fluidized bed gasifier.

4. The system of claim 1, wherein each of the first plurality of screw conveyors comprises a screw conveyor housing and an auger disposed within the screw conveyor housing, the auger being operatively coupled to a drive motor.

5. The system of claim 4, wherein the screw conveyor housing and the auger are configured to form a sealing relationship with the biomass feed material when disposed therein such that a synthesis gas formed from a reaction of the biomass material feed is substantially prevented from flowing through the screw conveyor housing to a respective secondary receptacle.

6. The system of claim 5, wherein the auger has a variable pitch.

7. The system of claim 1, wherein the first plurality of screw conveyors comprises at least eight screw conveyors and the plurality of secondary receptacles comprises at least eight secondary receptacles.

8. The system of claim 7, wherein the plurality of primary receptacles comprises a first primary receptacle and a second primary receptacle, wherein the first primary receptacle and the second primary receptacle are each spaced proximate to and on an opposing side of the fluidized bed gasifier from the other and circumferentially around the fluidized bed gasifier.

9. A system for producing a synthesis gas from a biomass material feed in a fluidized bed gasifier, comprising:

a first plurality of screw conveyors, each disposed equidistantly from an adjacent one of the first plurality of screw conveyors and circumferentially around and connected to or integral with a gasifier shell of the fluidized bed gasifier, wherein each of the first plurality of screw conveyors is in feed communication with a gasifier chamber defined by the gasifier shell;

a plurality of secondary hoppers each coupled to respective one of the first plurality of screw conveyors and further configured to provide a continuous feed of the biomass material feed to the respective one of the first plurality of screw conveyors; and a plurality of primary hoppers, each primary hopper configured to concurrently provide at least two secondary hoppers of the plurality of secondary hoppers with the continuous feed of the biomass material feed.

10. The system of claim 9, wherein each of the first plurality of screw conveyors is spaced circumferentially at least about 45 degrees from the adjacent one of the first plurality of screw conveyors.

11. The system of claim 10, wherein each of the first plurality of screw conveyors further comprises a screw conveyor housing and an auger disposed within the screw conveyor housing, the auger being operatively coupled to a drive motor.

12. The system of claim 11, wherein the screw conveyor housing and the auger are configured to form a sealing relationship with the biomass feed material when disposed therein such that the synthesis gas formed from a reaction of the biomass material feed is substantially prevented from flowing through the conveyor housing to a respective secondary receptacle.

13. The system of claim 12, wherein the auger has a variable pitch.

14. The system of claim 13, further comprising wherein each primary hopper includes a second plurality of screw conveyors configured to impart motion to the continuous feed when disposed therein.

15. The system of claim 14, wherein the each of the second plurality of screw conveyors is in feed communication with a respective one of the plurality of secondary hoppers.

16. The system of claim 14, further comprising;

a primary hopper level detector operatively coupled to the at least one primary hopper and configured to detect the level of the continuous feed disposed within the at least one primary hopper; and a plurality of secondary hopper level detectors, each operatively coupled to a respective one of the plurality of secondary hoppers and configured to detect the level of the continuous feed disposed within the respective one of the plurality of secondary hoppers.

* * * * *